United States Patent
Johnson et al.

(10) Patent No.: US 7,933,229 B2
(45) Date of Patent: *Apr. 26, 2011

(54) METHOD AND SYSTEM FOR SELECTIVE USAGE OF BROADBAND FORWARD LINK

(75) Inventors: Harold W. Johnson, Roach, MO (US); Mark L. Yarkosky, Overland Park, KS (US); Durga Prasad Satapathy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 700 days.

This patent is subject to a terminal disclaimer.

(21) Appl. No.: 11/866,582

(22) Filed: Oct. 3, 2007

(65) Prior Publication Data

US 2008/0031164 A1 Feb. 7, 2008

Related U.S. Application Data

(63) Continuation of application No. 11/142,641, filed on Jun. 1, 2005, now Pat. No. 7,313,109.

(51) Int. Cl.
*H04L 5/14* (2006.01)
(52) U.S. Cl. ......... 370/295; 370/330; 370/343; 455/450
(58) Field of Classification Search ............. 370/329, 370/295, 330
See application file for complete search history.

(56) References Cited

U.S. PATENT DOCUMENTS

| | | | |
|---|---|---|---|
| 6,049,721 A | 4/2000 | Serizawa et al. | |
| 6,137,784 A * | 10/2000 | Wallerius et al. | 370/328 |
| 6,339,589 B1 | 1/2002 | Uebayashi et al. | |
| 6,356,540 B1 | 3/2002 | Kojiro | |
| 6,388,999 B1 | 5/2002 | Gorsuch et al. | |
| 6,728,225 B1 | 4/2004 | Ozluturk | |
| 6,801,519 B1 | 10/2004 | Mangal | |
| 6,804,214 B1 | 10/2004 | Lundh et al. | |
| 7,313,109 B2 | 12/2007 | Johnson et al. | |
| 2001/0033614 A1 * | 10/2001 | Hudson | 375/229 |
| 2002/0051462 A1 * | 5/2002 | Ertel et al. | 370/442 |
| 2003/0109257 A1 | 6/2003 | Nilsson et al. | |
| 2003/0109284 A1 | 6/2003 | Akerberg et al. | |

(Continued)

FOREIGN PATENT DOCUMENTS

EP 1 065 897 A1 3/2001

OTHER PUBLICATIONS

Federal Communications Commission, "FCC Promotes the Deployment of Wireless Broadband Services by Creating New Rules for the 2495-2690 MHz Band While Protecting Educational Services," News Release, Jun. 10, 2004.

(Continued)

*Primary Examiner* — Seema S Rao
*Assistant Examiner* — Sai-Ming Chan

(57) ABSTRACT

A radio access network has a reverse link frequency band for receiving signals from mobile stations and has first and second forward link frequency bands for transmitting signals to mobile stations. The second forward link frequency band has a greater frequency bandwidth than the first forward link frequency band and occupies a different part of the radio frequency spectrum. For certain types of communication sessions, such as voice and low-speed data, the reverse link frequency band and the first forward link frequency band are used. For other types of communication sessions, such as high-speed data and streaming video, the reverse link frequency band and the second forward link frequency band are used.

13 Claims, 3 Drawing Sheets

U.S. PATENT DOCUMENTS

2005/0239403 A1* 10/2005 Karabinis .................... 455/12.1

OTHER PUBLICATIONS

Qualcomm, "IS-856-A Physical Layer," Aug. 2004.
Lawrence Harte, "Introduction to EVDO, Physical Channels, Logical Channels, Network and Operation," 2004.
International Search Report and Written Opinion from related International Application No. PCT/US2006/018101, mailed Oct. 2, 2006.
International Preliminary Report on Patentability from related International Application No. PCT/US2006/018101, mailed Dec. 21, 2007.

* cited by examiner

METHOD AND SYSTEM FOR SELECTIVE USAGE OF BROADBAND FORWARD LINK

CROSS-REFERENCE TO RELATED APPLICATIONS

This is a continuation of application Ser. No. 11/142,641, filed Jun. 1, 2005, which application is incorporated herein by reference.

BACKGROUND

1. Field of the Invention

The present invention relates to telecommunications and, more particularly, to a method and system for selectively using a broadband forward for certain types of communication sessions.

2. Description of Related Art

There is an increased interest in providing wireless telecommunications systems that support high rate packet data communications. One such system is 1xEV-DO, which may use an air interface format as specified in the IS-856 standard. In 1xEV-DO systems, mobile stations communicate with a base transceiver station (BTS) via an air interface. The communications over the air interface are in the form of data packets, whether the underlying media being transferred is voice, data, or some other type. In accordance with the IS-856 standard, a 1xEV-DO sector may achieve a peak data rate of 2.4 Mbps on the forward link (from the BTS to the mobile station) and 153.6 kbps on the reverse link (from the mobile station to the BTS). Revision A of 1xEV-DO, which may use an air interface format as specified in the IS-856-A standard, can provide even higher peak data rates: 3.1 Mbps on the forward link and 1.8 Mbps on the reverse link. A version of the IS-856 standard is described in $3^{rd}$ Generation Partnership Project 2, "cdma2000 High Rate Packet Data Air Interface Specification," 3GPP2 C.S0024, v2.0 (October 2000), and a version of the IS-856-A standard is described in $3^{rd}$ Generation Partnership Project 2, "cdma2000 High Rate Packet Data Air Interface Specification," 3GPP2 C.S0024-A, v1.0 (March 2004), which documents are incorporated herein by reference.

Although these EV-DO approaches can provide higher data transfer rates than conventional (1xRTT) CDMA, there continues to be a need to provide additional bandwidth in wireless telecommunications networks.

SUMMARY

In a first principal aspect, an exemplary embodiment of the present invention provides a method of allocating radio resources for wireless communication. In accordance with the method, a request to establish a communication session between a mobile station and a radio access network is received. In response to the request, a working frequency division duplex (FDD) configuration is selected from among at least a first FDD configuration and a second FDD configuration. The first FDD configuration includes a reverse link frequency band and a first forward link frequency band. The second FDD configuration includes the reverse link frequency band and a second forward link frequency band. The first forward link frequency band includes traffic channels with a first frequency bandwidth, and the second forward link frequency band includes traffic channels with a second frequency bandwidth. The first and second forward link frequency bands are non-overlapping, and the second frequency bandwidth is greater than the first frequency bandwidth.

In a second principal aspect, an exemplary embodiment of the present invention provides a radio access network that comprises a first base transceiver station (BTS), a second BTS, and a base station controller (BSC) communicatively coupled to the first BTS and to the second BTS. The first BTS receives reverse link signals in a reverse link frequency band and transmits forward link signals in a first forward link frequency band. The first forward link frequency band has a first frequency bandwidth. The second BTS transmits forward link signals in a second forward link frequency band. The second forward link frequency band has a second frequency bandwidth that is greater than the first frequency bandwidth. The first and second frequency bands are non-overlapping.

DETAILED DESCRIPTION OF EXEMPLARY EMBODIMENTS

1. Overview

Figure 1:
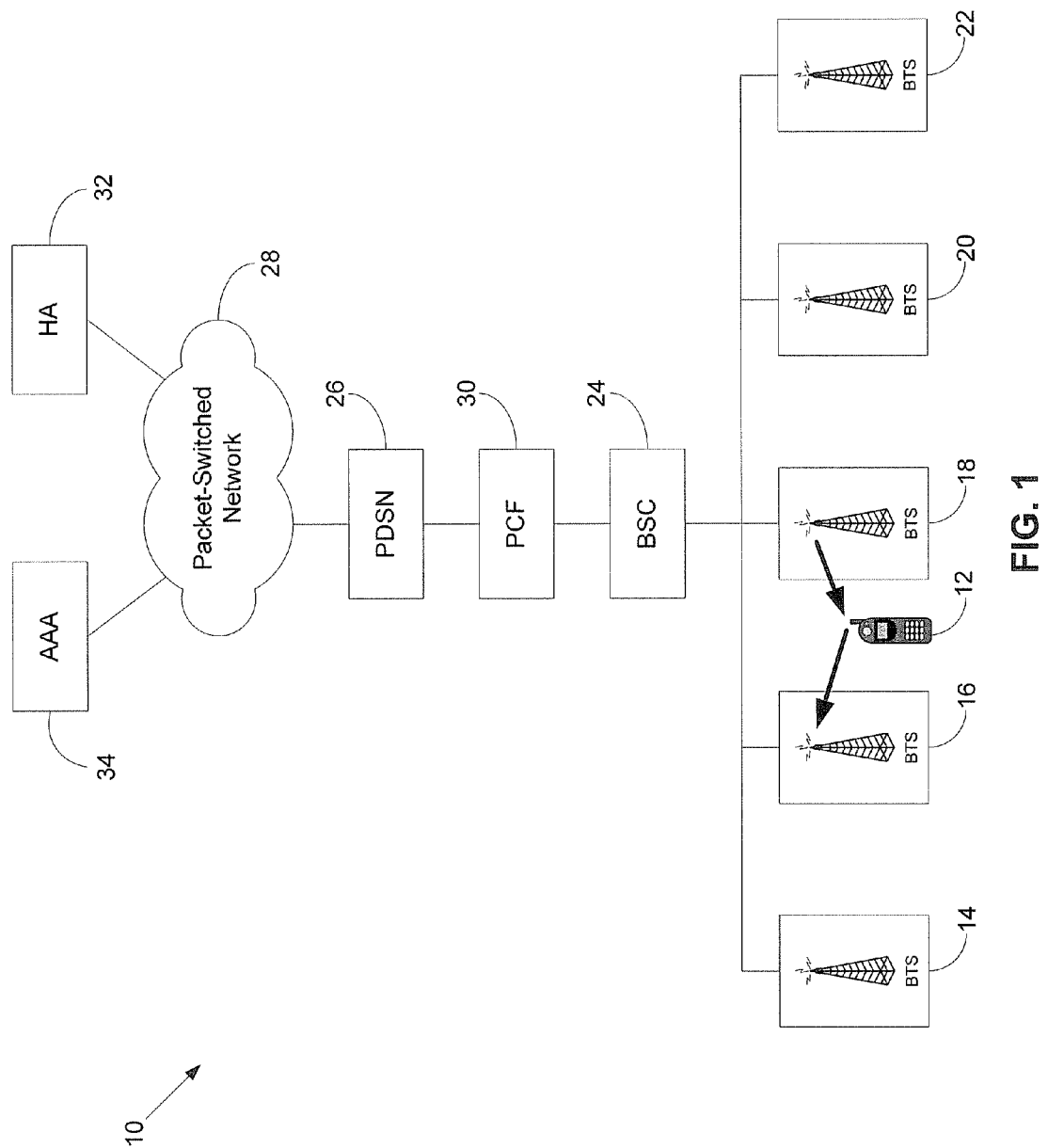
FIG. 1 is a simplified block diagram of a wireless telecommunications network, in accordance with an exemplary embodiment of the present invention.

The present invention provides additional bandwidth for wireless communications by providing a radio access network with an additional frequency band for forward link communications. In an exemplary embodiment, the additional frequency band has a greater frequency bandwidth and occupies a different part of the radio frequency spectrum than the reverse link and forward link frequency bands already used by the radio access network. The additional frequency band may be used selectively, e.g., for communication sessions that can benefit from a higher bandwidth forward link.

For example, a radio access network may use a reverse link frequency band for receiving signals from mobile stations and a first forward link frequency band for transmitting signals to mobile stations. These frequency bands may each have a bandwidth of 1.25 MHz in the 1.9 GHz Personal Communication Services (PCS) band. In accordance with an exemplary embodiment of the present invention, the radio access network may also be provided with a second forward link frequency band for transmitting signals to mobile stations. The second forward link frequency band may have a bandwidth of 5 MHz in the 2.5 GHz Broadband Radio Service (BRS) band. Thus, the radio access network can use either the first or the second forward link frequency band for communicating with a mobile station.

In an exemplary embodiment, the radio access network uses the same reverse link frequency band for reverse link communications regardless of whether the first forward link frequency band or the second forward link frequency band is used for forward link communications. Thus, the radio access network may be able to select from among at least a first frequency division duplex (FDD) configuration and a second FDD configuration. The first FDD configuration is a symmetric configuration that includes the reverse link frequency band and the first forward link frequency band. The second FDD configuration is an asymmetric configuration that includes the same reverse link frequency band and the second, higher-bandwidth forward link frequency band.

The radio access network may select from among the first and second FDD configurations for a communication session with a mobile station based upon one or more factors, such as the type of communication session, the service level to which the mobile station's user has subscribed, and radio resource availability. For example, a mobile station user may subscribe to a service level in which the first FDD configuration is the default configuration and the second FDD configuration is preferred for certain types of communication sessions. The second FDD configuration may be preferred for communication sessions that typically have asymmetric traffic levels.

For example, in many types of data sessions, such as Web browsing, the mobile station typically receives much more data than the mobile station transmits. A high-bandwidth forward link can, thus, be beneficial. Such high-speed data sessions may be well-suited to the second, asymmetric FDD configuration, in which the forward link has more bandwidth than the reverse link. Streaming video session, in which the mobile station is receiving video may also be well-suited to the second, asymmetric FDD configuration. Other types of data sessions, however, such as sending and receiving e-mail messages, may use less bandwidth and may be more symmetric. For such low-speed data sessions, the first, symmetric FDD configuration, may be adequate. In addition, the first, symmetric FDD configuration may be adequate for voice sessions. Thus, in an exemplary embodiment, the second, asymmetric FDD configuration may be preferred for high-speed data sessions and streaming video sessions, whereas the first, symmetric FDD configuration may be used for low-speed data sessions and voice sessions.

It is to be understood, however, that while the second FDD configuration may be well-suited for certain types of communication sessions, the selection from among the first and second FDD configurations may also depend on the user's subscribed service level and/or on radio resource availability. For example, some users may subscribe to only a basic service level that does not provide any access to the second FDD configuration. Other users may subscribe to a higher service level, for which the first FDD configuration is the default and the second FDD configuration is preferred for certain types of communication sessions. Still other users may subscribe to a premiere service level in which the second FDD configuration is preferred for all types of communication sessions. Moreover, whether the second FDD configuration is selected for a given communication session may also depend on radio resource availability, i.e., on whether the mobile station is within the wireless coverage area of a base transceiver station that provides a high-bandwidth forward link and on whether that base transceiver station has an available forward link traffic channel.

The selection from among the first and second FDD configurations may be based on a preference from the mobile station. For example, when the mobile station transmits a request for a traffic channel, the request may indicate that a high-bandwidth forward link is preferred. Based on this request, the radio access network may select the second FDD configuration, if available, and assign a forward traffic channel in the high-bandwidth forward link frequency band. Alternatively, the radio access network may select from among the first and second FDD configurations independently of any preference from the mobile station.

In an exemplary embodiment, different base transceiver stations (BTSs) are used to provide the high-bandwidth forward link than are used to provide the low-bandwidth forward and reverse links. For example, the high-bandwidth forward link BTSs may be provided with high antennas and may broadcast at a high power level so as to provide "macrocell" coverage, i.e., a wireless coverage area that is substantially larger than that provided by the low-bandwidth BTSs. More particularly, the wireless coverage areas of multiple low-bandwidth BTSs may be encompassed within the wireless coverage area provided by one high-bandwidth BTS. Thus, when the second FDD configuration is used, a mobile station may transmit reverse link signals to a nearby, low-bandwidth BTS but may receive forward link signals from a more distant, high-bandwidth BTS. In this way, the amount of additional infrastructure needed to provide the additional, high-bandwidth forward link can be reduced.

2. Exemplary Architecture

FIG. 1 is a block diagram illustrating an exemplary wireless telecommunications network 10. In this exemplary embodiment, network 10 communicates with mobile stations, such as mobile station 12, using an EV-DO air interface. It is to be understood, however, that other types of air interfaces could be used.

Wireless telecommunications network 10 includes BTSs 14, 16, 18, 20, and 22. Some of these BTSs may be low-bandwidth BTSs that communicate using low-bandwidth forward and reverse links, whereas others may be high-bandwidth BTSs that communicate using a high-bandwidth forward link. For example, BTS 18 could be a high-bandwidth BTS, and BTSs 14, 16, 20, and 22 could be low-bandwidth BTSs. Thus, in a communication session that uses a symmetric FDD configuration, mobile station 12 may communicate with the same BTS, e.g., BTS 16, for both forward and reverse link communications. However, in a communication session that uses an asymmetric FDD configuration, mobile station 12 may receive forward link signals from a high-bandwidth BTS, such as BTS 18 and may transmit reverse link signals to a low-bandwidth BTS, such as BTS 16, as illustrated in FIG. 1.

BTSs 14, 16, 18, and 20 may be controlled by a base station controller (BSC) 24. For example, BSC 24 may control the assignment of the traffic channels used by these BTSs. Thus, when traffic channels are assigned for a communication session, BSC 24 may control whether a low-bandwidth forward link or a high-bandwidth forward link is used. BSC 24 may also control handoffs from among these BTSs and may perform other functions. Although FIG. 1 shows BSC 24 in control of five BTSs, a BSC could control a greater or fewer number of BTSs.

BSC 24 is communicatively coupled to a packet data serving node (PDSN) 26 that provides access to a packet-switched network 28. BSC 24 may communicate with PDSN 26 via a packet control function (PCF) 30 that manages the transfer of packets between BSC 24 and PDSN 26. Alternatively, the PCF function may be integrated into BSC 24.

Packet-switched network 28 could be a wide area network, such as the Internet, that routes packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 28 in a real-time format. Other protocols, such as the Session Initiation Protocol (SIP), may be used to set up and/or manage communication sessions through packet-switched network 28. Voice, data, and/or other media may be exchanged in such communication sessions. In this way, mobile stations, such as mobile station 12 may be able to communicate with a variety of different endpoints via packet-switched network 28.

During such communication sessions, PDSN 26 may send and receive packets on behalf of mobile station 12. PDSN 26 may also perform other functions. For example, if mobile station 12 uses Mobile IP, then PDSN 26 may act as a foreign agent, communicating with a home agent 32. PDSN 26 may also communicate with an AAA server 34 that performs authentication, authorization, and accounting functions for mobile stations, such as mobile station 12. For example, PDSN 26 may communicate with AAA server 34 in accordance with RADIUS protocols.

Figure 2:
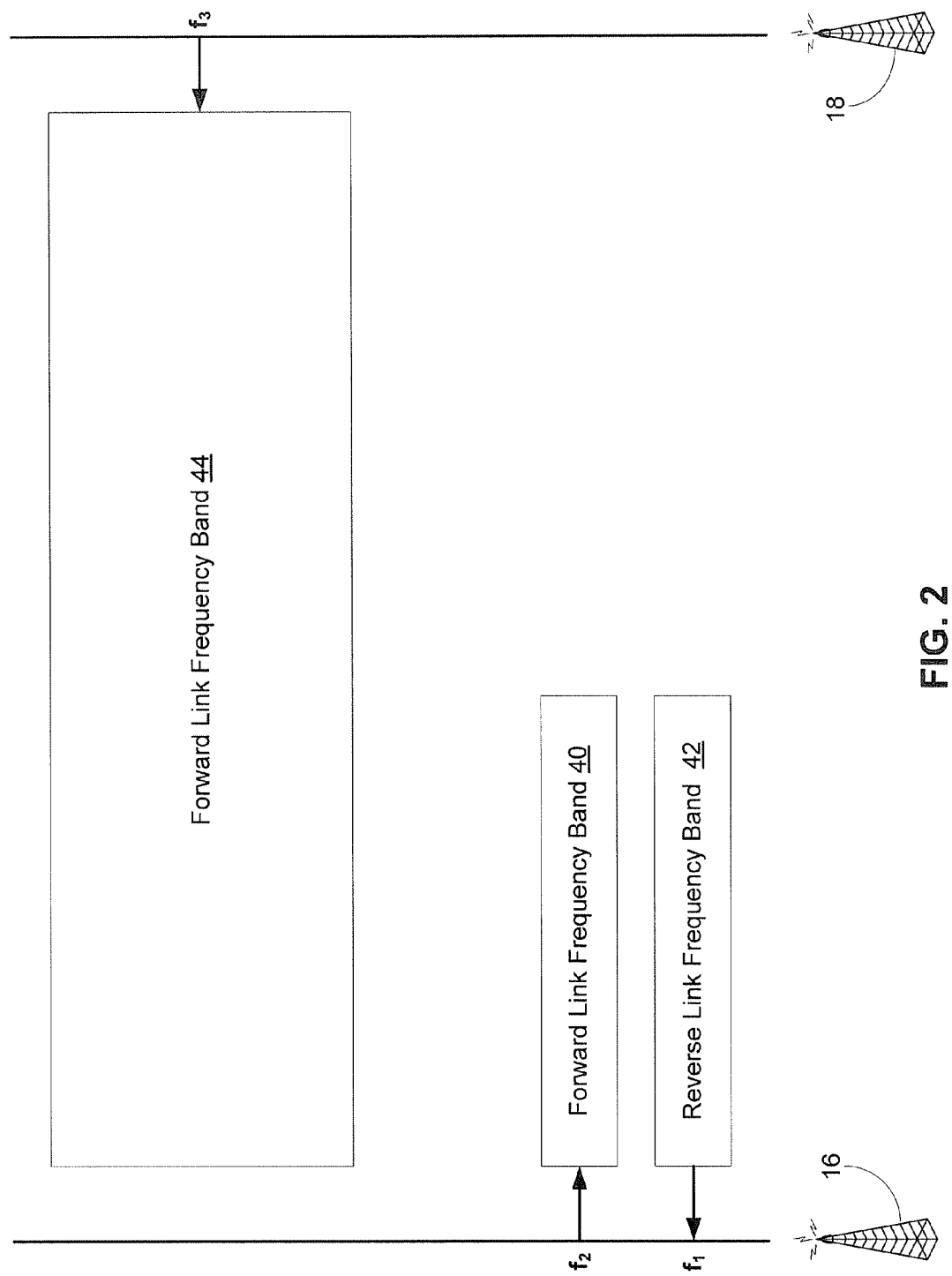
FIG. 2 is a schematic diagram illustrating the reverse and forward link frequency bands used by two of the base transceiver stations (BTSs) shown in FIG. 1, in accordance with an exemplary embodiment of the present invention.

FIG. 2 illustrates the frequency bands that may be available in the case where BTS 16 is a low-bandwidth BTS and BTS 18 is a high-bandwidth BTS. As shown in FIG. 2, BTS 16 may have forward link channels in a first forward link frequency band 40 and reverse link channels in a reverse link frequency band 42, whereas BTS 18 may have forward link channels in a second forward link frequency band 44. In an exemplary embodiment, BTSs 16 and 18 communicate using an EV-DO air interface. Thus, the forward link channels may be time division multiplexed and may include a pilot channel, a medium access control (MAC) channel, a plurality of forward link traffic channels, and a control channel. The reverse link channels may be code division multiplexed and may include a plurality of access channels and a plurality of reverse link traffic channels.

The channels in reverse link frequency band 42 and in forward link frequency band 40 may use carrier frequencies $f_1$ and $f_2$, respectively. Frequencies $f_1$ and $f_2$ could be located in a band that is licensed for mobile wireless communications, such as the 1.9 GHz PCS frequency band. The channels in forward link frequency band 44 may use a carrier frequency, $f_3$, that is located in a different part of the radio frequency spectrum. In an exemplary embodiment, frequency $f_3$ is located in a higher frequency part of the spectrum than $f_1$ and $f_2$. For example, frequency $f_3$ could be located in the 2.5 GHz BRS band. Alternatively, $f_3$ could be located in a lower frequency part of the spectrum than $f_1$ and $f_2$. For example, $f_3$ could be in a 450 MHz band or in an 800 MHz band. It is to be understood that the frequencies given here for $f_1$, $f_2$, and $f_3$ are exemplary only, as these frequencies could be located in other parts of the radio frequency spectrum.

Forward link carrier frequency $f_3$ may have a greater frequency separation from reverse link carrier frequency $f_1$ than does forward link carrier frequency $f_2$. For example, with $f_1$ and $f_2$ in the 1.9 GHz PCS band and $f_3$ in the 2.5 MHz BRS band, the spacing between $f_1$ and $f_2$ may be about 80 MHz, whereas the spacing between $f_1$ and $f_3$ would be much higher. Forward link frequency band 44 may also have a higher bandwidth. For example, forward link frequency band 40 and reverse link frequency band 42 could each have a frequency bandwidth of 1.25 MHz, whereas forward link frequency band 44 could have a frequency bandwidth of 5 MHz.

In this way, BTS 16 and BTS 18 together can provide two different FDD configurations. In particular, BSC 24 may control BTS 16 and BTS 18 to assign traffic channels in either a first FDD configuration or a second FDD configuration for a given communication session with a mobile station, such as mobile station 12. In the first FDD configuration, a forward link traffic channel in forward link frequency band 40 is used for communications to the mobile station, and a reverse link traffic channel in reverse link frequency band 42 is used for communications from the mobile station. In the second FDD configuration, a forward link traffic channel in forward link frequency band 44 is used for communications to the mobile station, and a reverse link traffic channel in reverse link frequency band 42 is used for communications from the mobile station.

The first and second FDD configurations may use the same reverse link frequency band for reverse link communications. However, as compared to the first FDD configuration, the second FDD configuration provides more bandwidth for forward link communications, so that the mobile station can receive data more rapidly, and with greater frequency separation between the forward and reverse links, thereby allowing the forward link to be transmitted at a higher power level.

3. Exemplary Operation

Figure 3:
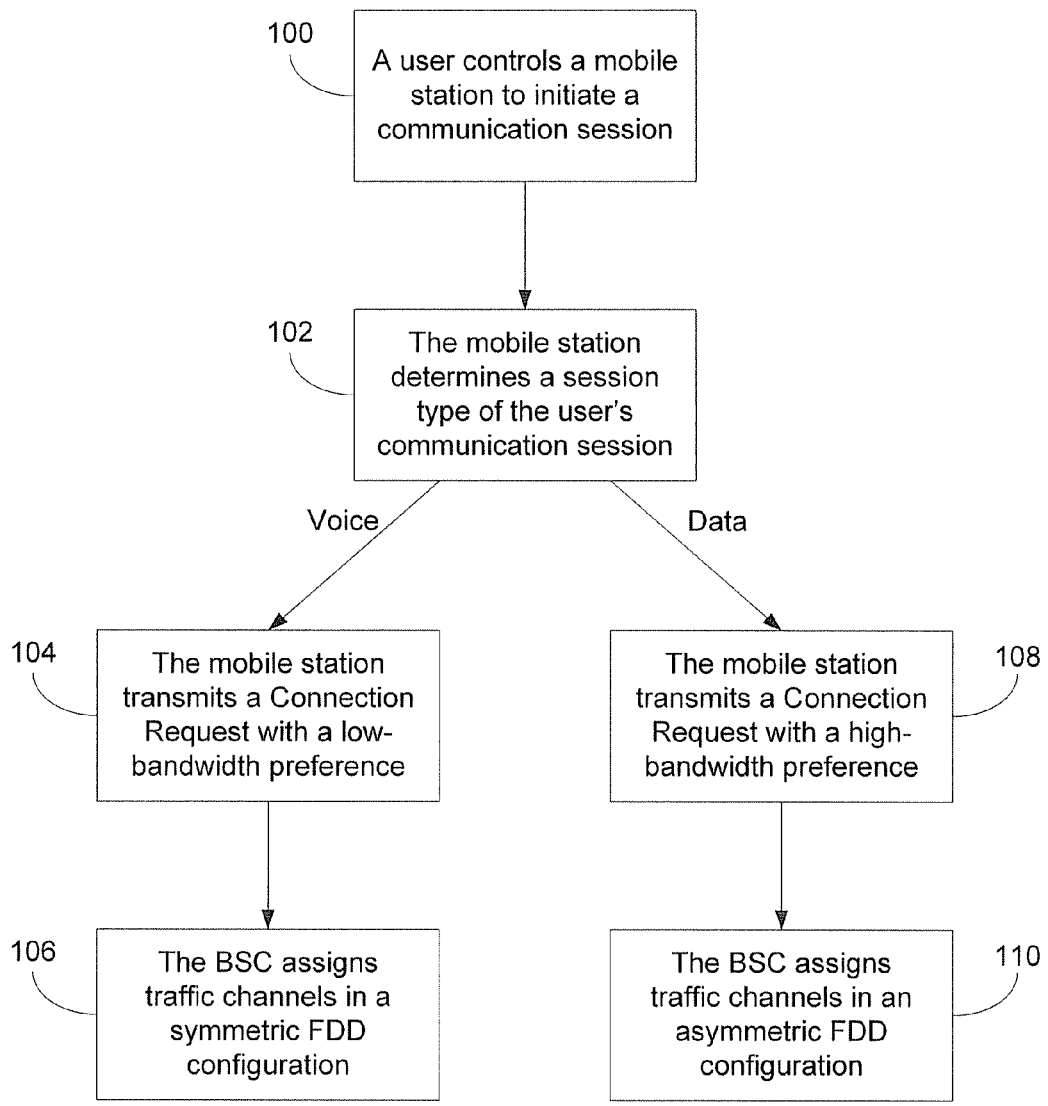
FIG. 3 is a flow chart illustrating a method for selecting between a symmetric frequency division duplex (FDD) configuration and an asymmetric FDD configuration, in accordance with an exemplary embodiment of the present invention.

In an exemplary embodiment, the mobile station indicates a preference for a high-bandwidth or a low-bandwidth forward traffic channel, e.g., when the mobile station requests a traffic channel for a communication session. In the case of an EV-DO air interface, the mobile station can indicate this preference when the mobile station transmits a Connection Request message. This approach is illustrated in FIG. 3.

The process may begin when a user controls a mobile station to initiate a communication session, as indicated by block 100. The communication session could be a voice session, e.g., a voice-over-packet (VoP) telephone call, a data session, e.g., wireless Web browsing, or some other type of session. The mobile station may then apply a service profile that specifies what type of forward link traffic channel is preferred for each type of communication session. In this example, the mobile station's service profile specifies that a low-bandwidth forward link is preferred for voice sessions, and a high-bandwidth forward link is preferred for data sessions. Thus, the mobile station determines a session type of the user's communication session, as indicated by block 102.

The mobile station then transmits a Connection Request that indicates a preference for either a low-bandwidth forward traffic channel or a high-bandwidth forward traffic channel, depending on the session type of the user's communication session. For example, if the user has requested a voice session, then the mobile station may transmit a Connection Request with a low-bandwidth preference, as indicated by block 104. Based on this preference, the BSC may assign traffic channels in a symmetric FDD configuration, as indicated by block 106. For example, with reference to FIG. 2, the BSC may assign a forward traffic channel in forward link frequency band 40 and a reverse traffic channel in reverse link frequency band 42. Thus, the mobile station communicates with BTS 16 for both the forward and reverse links.

On the other hand, if the user has requested a data session, then the mobile station may transmit a Connection Request with a high-bandwidth preference, as indicated by block 108. Based on this preference, the BSC may assign traffic channels in an asymmetric FDD configuration, as indicated by block 110. For example, with reference to FIG. 2, the BSC may assign a forward traffic channel in forward link frequency band 44 and a reverse traffic channel in reverse link frequency band 42. Thus, the mobile station communicates with BTS 16 for the reverse link but receives forward link signals from BTS 18. It is to be understood, however, that if forward link frequency band 44 is unavailable, either because the mobile station is not in the wireless coverage area of BTS 18 or because there is no forward traffic channel available in forward link frequency band 44, then the BSC may instead assign traffic channels in a symmetric configuration.

In addition, the example of FIG. 3 assumes that the mobile station has a service level subscription in which the mobile station chooses between a low-bandwidth forward link for voice sessions and a high-bandwidth forward link for data sessions. For other service levels, the low-bandwidth forward link and/or high-bandwidth forward link may be preferred for different types of communication sessions. In still other embodiments, the BSC, rather than the mobile station, may determine whether the low-bandwidth forward link or the high-bandwidth forward link is preferred. The BSC may make this determination based on the session type and/or on the service level to which the mobile station's user has subscribed.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of allocating radio resources for wireless communication, said method comprising:
receiving a request to establish a communication session between a mobile station and a radio access network for a user of said mobile station, said communication session having a session type; and
in response to said request, selecting a working frequency division duplex (FDD) configuration from among at least a first FDD configuration and a second FDD configuration based on at least a service level subscription of said user, said first FDD configuration including a reverse link frequency band and a first forward link frequency band, said second FDD configuration including said reverse link frequency band and a second forward link frequency band, said first forward link frequency band including traffic channels with a first frequency bandwidth, said second forward link frequency band including traffic channels with a second frequency bandwidth, wherein said first and second forward link frequency bands are non-overlapping and said second frequency bandwidth is greater than said first frequency bandwidth.

2. The method claim 1, wherein said working FDD configuration is selected based on at least said service level subscription of said user and said session type.

3. The method of claim 2, wherein said first FDD configuration is selected as said working FDD configuration if said session type corresponds to a voice session or low speed data session and said second FDD configuration is selected as said working FDD configuration if said session type corresponds to a high speed data session or streaming video session.

4. The method of claim 1, wherein said request includes a bandwidth preference.

5. The method of claim 4, wherein said working FDD configuration is selected based on at least said service level subscription of said user and said bandwidth preference.

6. The method of claim 5, wherein said first FDD configuration is selected as said working FDD configuration if said bandwidth preference is a low-bandwidth preference and said second FDD configuration is selected as said working FDD configuration is said bandwidth preference is a high-bandwidth preference.

7. The method of claim 4, further comprising:
said mobile station selecting said bandwidth preference from among at least a low-bandwidth preference and a high-bandwidth preference based on a service profile.

8. The method of claim 7, wherein said low-bandwidth preference is selected if said session type corresponds to a voice session or low speed data session and said second high-bandwidth preference is selected if said session type corresponds to a high speed data session or streaming video session.

9. The method of claim 1, further comprising:
selecting said second FDD configuration as said working FDD configuration;
selecting a reverse traffic channel in said reverse link frequency band; and
selecting a forward traffic channel in said second forward link frequency band.

10. The method of claim 9, wherein said forward traffic channel has a greater frequency bandwidth than said reverse traffic channel.

11. The method of claim 9, wherein said forward traffic channel has a higher carrier frequency than said reverse traffic channel.

12. The method of claim 9, wherein said forward traffic channel is a time division multiplexed channel and said reverse traffic channel is a code division multiplexed channel.

13. The method of claim 1, wherein said first forward link frequency band provides wireless coverage in a first wireless coverage area and said second forward link frequency band provides wireless coverage in a second wireless coverage area, said second wireless coverage area being larger than said first wireless coverage area.

* * * * *